United States Patent
Hensel et al.

(10) Patent No.: US 12,458,172 B2
(45) Date of Patent: Nov. 4, 2025

(54) GRINDER, GRINDING DISK FOR A GRINDER, AND COFFEE MACHINE HAVING A GRINDER OF THIS TYPE

(71) Applicant: Melitta Professional Coffee Solutions GmbH & Co. KG, Minden (DE)

(72) Inventors: Armin Hensel, Rahden (DE); Bernd Buchholz, Rahden (DE)

(73) Assignee: Melitta Professional Coffee Solutions GmbH & Co. KG, Minden (DE)

( * ) Notice: Subject to any disclaimer, the term of this patent is extended or adjusted under 35 U.S.C. 154(b) by 757 days.

(21) Appl. No.: 17/777,117

(22) PCT Filed: Dec. 16, 2020

(86) PCT No.: PCT/EP2020/086360
§ 371 (c)(1),
(2) Date: May 16, 2022

(87) PCT Pub. No.: WO2021/122700
PCT Pub. Date: Jun. 24, 2021

(65) Prior Publication Data
US 2023/0355038 A1    Nov. 9, 2023

(30) Foreign Application Priority Data
Dec. 18, 2019    (DE) .................... 10 2019 134 875.7

(51) Int. Cl.
*A47J 42/46*    (2006.01)
*A47J 31/42*    (2006.01)
*A47J 42/16*    (2006.01)

(52) U.S. Cl.
CPC .............. *A47J 42/46* (2013.01); *A47J 31/42* (2013.01); *A47J 42/16* (2013.01)

(58) Field of Classification Search
CPC .. A47J 42/46; A47J 42/16; A47J 42/06; A47J 31/42
See application file for complete search history.

(56) References Cited

U.S. PATENT DOCUMENTS 10,405,700 B2     9/2019    Pai
10,791,875 B2*   10/2020    Guo .................. A47J 42/38
(Continued)

FOREIGN PATENT DOCUMENTS

| CA | 2 471 129 A1 | 12/2004 |
| CH | 262751 A | 7/1949 |

(Continued)

OTHER PUBLICATIONS

International Search Report in PCT/EP2020/086360, mailed Mar. 23, 2021.

(Continued)

*Primary Examiner* — Reginald Alexander
(74) *Attorney, Agent, or Firm* — Collard & Roe, P.C.

(57) ABSTRACT

A grinder for grinding coffee beans has a first grinding disk carrier having a first grinding disk; a second grinding disk carrier having a second grinding disk; and a drive unit, by means of which at least one of the two grinding disks is rotatably operated. At least the grinding disk of the two grinding disks that is rotatably operated by means of the drive unit is directly or indirectly coupled to the drive unit by means of a central interlocking connection, the central interlocking connection being in the form of a continuous shaft-hub connection for direct torque transfer from the drive unit directly or indirectly to the grinding disk.

14 Claims, 10 Drawing Sheets

(56) References Cited

U.S. PATENT DOCUMENTS

| | | |
|---|---|---|
| 10,813,499 B2 | 10/2020 | Pai |
| 2009/0134255 A1 | 5/2009 | Tang |
| 2016/0184830 A1 | 6/2016 | Misumi et al. |
| 2021/0038026 A1* | 2/2021 | Bonotto .................. A47J 42/46 |

FOREIGN PATENT DOCUMENTS

| | | | | |
|---|---|---|---|---|
| CN | 102343293 A | 2/2012 | | |
| DE | 88 02 375 U1 | 6/1988 | | |
| DE | 20 2006 003 760 U1 | 6/2006 | | |
| DE | 202007016141 U1 * | 4/2008 | .............. | A47J 42/16 |
| DE | 20 2017 100 154 U1 | 1/2017 | | |
| EP | 1 493 368 B1 | 10/2005 | | |
| EP | 2 050 377 A1 | 4/2009 | | |
| EP | 2810592 A1 | 12/2014 | | |
| EP | 2 956 039 A1 | 12/2015 | | |
| EP | 3114975 A1 * | 1/2017 | .............. | A47J 31/42 |
| JP | 2014236985 A | 12/2014 | | |
| JP | 2018075562 A | 5/2018 | | |
| WO | WO-2010062098 A2 * | 6/2010 | .............. | A47J 31/42 |

OTHER PUBLICATIONS

German Search Report dated May 4, 2020 in German Application No. 10 2019 134 875.7 with English translation of the relevant parts.

* cited by examiner

GRINDER, GRINDING DISK FOR A GRINDER, AND COFFEE MACHINE HAVING A GRINDER OF THIS TYPE

CROSS REFERENCE TO RELATED APPLICATIONS

This application is the National Stage of PCT/EP2020/086360 filed on Dec. 16, 2020, which claims priority under 35 U.S.C. § 119 of German Application No. 10 2019 134 875.7 filed on Dec. 18, 2019, the disclosure of which is incorporated by reference. The international application under PCT article 21 (2) was not published in English.

The invention relates to a grinder for grinding coffee beans according to the preamble of claim 1, as well as to a grinding disk and a coffee machine, in particular a fully automatic coffee machine, having such a grinder.

In the prior art, there are essentially two proven types of coffee grinders used in coffee machines. One is a disk grinder and the other is a cone grinder. Both types of grinders have in common that they consist of two grinding disks, wherein one of these tools is fixed and the other is driven. The rotational movement of one grinding disk draws the coffee beans to be ground into a grinding gap and grinds them finer and finer as the grinding gap narrows. The smallest distance between the two grinding disks is decisive for the degree of grind produced for the coffee powder.

As a rule, grinding disks in disk grinders are fixed to the respective carriers by means of screw-on holes with screws. On the one hand, these holes reduce the cutting performance of the grinding disk. On the other hand, coffee grounds can deposit in these areas and are thus not completely discharged from the grinder.

Patent specification EP1493368B1 describes another possibility for mounting. The grinding disks are screwed into the respective carrier by means of a bayonet catch. For this purpose, there are elongated interrupted elevations on the circumference of the grinding disks, which are inserted into a carrier slot by means of a plug-in rotary movement. Since the grinder is only ever operated in one direction of rotation, the disk and carrier are locked against rotation and the disks are also locked in one axial degree of freedom.

The invention therefore has the object of further developing a generic grinder in a functionally advantageous manner.

The invention solves this problem by a grinder, a grinding disk, and a coffee machine as described below.

A grinder according to the invention for grinding coffee beans comprises a first grinding disk carrier having a first grinding disk, a second grinding disk carrier having a second grinding disk, and a drive unit by means of which at least one of the two grinding disks is rotatably driven. At least that grinding disk of the two grinding disks which is rotatably driven by the drive unit is coupled to the drive unit directly or indirectly via a central interlocking connection, wherein this central interlocking connection is designed as a continuous shaft-hub connection for direct torque transmission from the drive unit directly or indirectly to the grinding disk.

To transmit a drive torque from the drive unit to the grinding disk, it is advantageous to achieve a form fit between the grinding disk and the carrier that transmits large forces and at the same time does not cause any disturbing openings in which coffee grounds can settle.

The grinder according to the invention is used for grinding coffee beans. It can be used as a stand-alone device or integrated in a coffee machine, e.g. a fully automatic coffee machine.

A grinding disk according to the invention for the above grinder has an aperture with a centric inner contour. This is of great advantage for simple and quick assembly or replacement.

In one embodiment, the second grinding disk, which is rotatably driven by the drive unit, has an aperture with a centric inner contour that is positively engaged with a centric contour of a carrier of the second grinding disk carrier, wherein the carrier is connected to a drive shaft of the drive unit.

A coffee machine according to the invention, in particular a fully automatic coffee machine, has the grinder as described above.

A particular advantage is provided by the form fit at the inner passage area of the grinding disk, which is usually designed as a simple hole and where no finely ground coffee is yet present at this point during the grinding process. The passage is designed as a form-fit contour. In this way, particularly large drive torques and holding torques can advantageously be transmitted, and no disturbing geometries are created on the outer diameter of the grinding disks.

Another particular advantage is that, in contrast to the prior art, the grinding disks do not have screw-on holes with screws, which means that the cutting performance of the grinding disk is not impaired, and as a result no coffee grounds can be deposited in these areas. The ground coffee can therefore be dispensed completely.

In a further design, the carrier of the second grinding disk carrier has a ring section which is arranged around the centric contour. This provides a simple and support surface for the second grinding disk.

It is also advantageous if the carrier of the second grinding disk carrier has a free space which is defined by the ring section and the centric contour. This provides simple additional accommodation of a section of the grinding disk.

A further embodiment provides that the first grinding disk and the second grinding disk each have an aperture with a centric inner contour, wherein the first grinding disk is in positive engagement with its centric inner contour with a centric contour projection of a carrier of the first grinding disk carrier. This results in the advantage that only one grinding disk design is required for the grinder, wherein both grinding disks can be identical.

Advantageously, if the contour projection of the carrier of the first grinding disk carrier has a centric aperture, this centric aperture will allow coffee beans from a hopper to access a grinding chamber between the grinding disks.

In a further embodiment, it is provided that the first grinding disk and the second grinding disk each have radially projecting lugs that are formed on the outer circumferences of the first grinding disk and the second grinding disk in a regularly distributed manner. These lugs are also referred to as snap lugs and advantageously serve to axially secure the grinding disks in the respective grinding disk carrier. Since the torque for the respective grinding disk is transmitted via the form fit of the contour of the carrier and the inner contour at the inner passage of the respective grinding disk, the lugs can be designed very filigree, since they do not transmit any torque. In the case of the first grinding disk, the associated torque is a holding torque when the first grinding disk is stationary. In the case of the second grinding disk, which is operated by the drive unit, the associated torque is a drive torque.

Due to this constructional embodiment, it is also advantageously possible to design the lower and upper grinding disks as identical parts.

In a still further embodiment, the first grinding disk is inserted into a carrier of the first grinding disk carrier and is axially guided in the carrier and axially secured by means of the lugs. In a further design, this first grinding disk, also called the upper grinding disk, can be permanently clipped into a plastic carrier including compression springs for force control. The plastic carrier can also be inserted and latched or clipped into the carrier. This enables advantageously simple assembly.

In one embodiment, the first grinding disk can be advantageously inserted into the carrier of the first grinding disk carrier in such a way that the lugs are each axially displaceably guided and axially secured in a groove.

This is also advantageous because in this way an axial degree of freedom is formed for the first grinding disk for force control.

In another embodiment, tab-like projections are disposed on the outer circumference of the ring section of the carrier of the second grinding disk carrier in a regularly distributed manner and project from the ring section of the carrier of the second grinding disk carrier, wherein the tab-like projections each have a recess formed therein which engages a respective lug of the second grinding disk.

In this way, the lugs in the lower, i.e. in the carrier of the second grinding disk carrier can ideally be recessed into the recesses behind the ejector geometries, which are formed here by the tab-like projections. In this way, the lugs can also serve as a guide when inserting the grinding disk.

The grinder can be designed as a disk or roller or cone grinder. The adjustment device thus has an advantageously wide range of applications.

In a further embodiment, the centric inner contours of the grinding disks, the contour projection of the carrier of the first grinding disk carrier and the centric contour of the carrier of the second grinding disk carrier are formed as a polygon, preferably hexagon, triangle, square, oval, ellipse and the like, wherein the centric inner contour of the first grinding disk and the contour projection of the carrier of the first grinding disk carrier correspond with each other, and wherein the centric inner contour of the second grinding disk and the centric contour of the carrier of the second grinding disk carrier correspond with each other.

The contours, e.g. as a hexagon, can have an interference fit for the driven second grinding disk and its carrier when the second grinding disk is inserted into the plastic carrier, in the event that the operator no longer wishes to remove the second grinding disk from the grinder. If it is desired to remove the second grinding disk for maintenance reasons, the form fit (e.g. hexagonal) is designed as a clearance fit. Since the grinding disks press apart during the grinding process, no further axial securing of the second grinding disk is required. Thus, the second grinding disk is advantageously simply inserted into the carrier, which is a very assembly- and maintenance-friendly solution.

For a use of only one grinding disk type in a grinder with two grinding disks, the grinding disk can have radially protruding lugs which are formed on the outer circumferences of the grinding disk in a regularly distributed manner. Thus, on the one hand, these lugs serve only for guiding during insertion of the second grinding disk into the carrier of the second grinding disk carrier and, on the other hand, for axial guiding and an axial stop of the first grinding disk in the carrier of the first grinding disk carrier.

Further advantageous designs are apparent from the remaining subclaims.

In the following, the invention is described in more detail by means of an exemplary embodiment with reference to the drawings. The figures serve only to explain the invention in more detail and are not restrictive of the invention. Individual features described can also be applied in their own right to further embodiment variants within the scope of general skill in the art, wherein.

Figure 1:
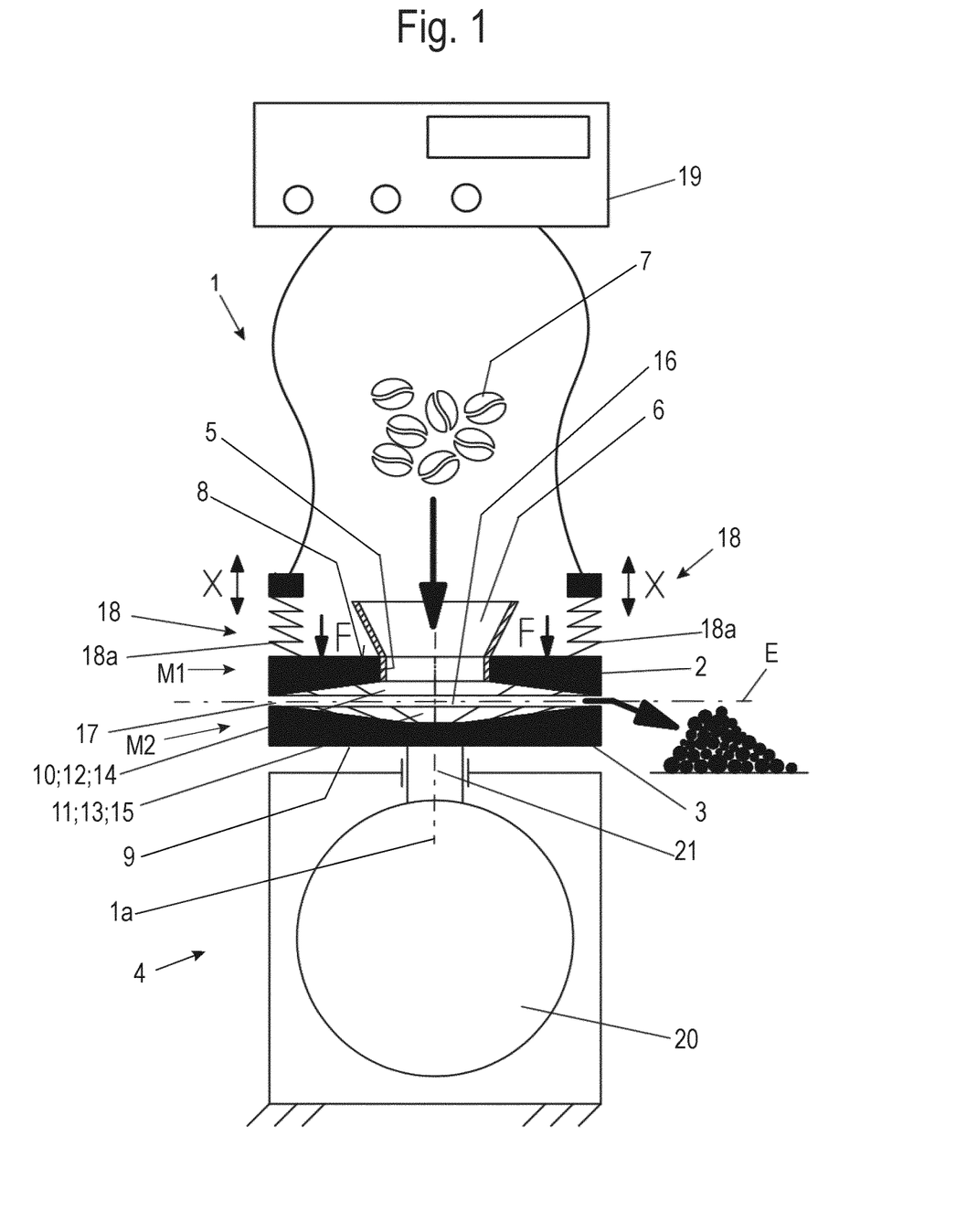
FIG. 1: shows a schematic front view in section of a principle of a grinder according to the invention for grinding coffee beans.
Figure 2:
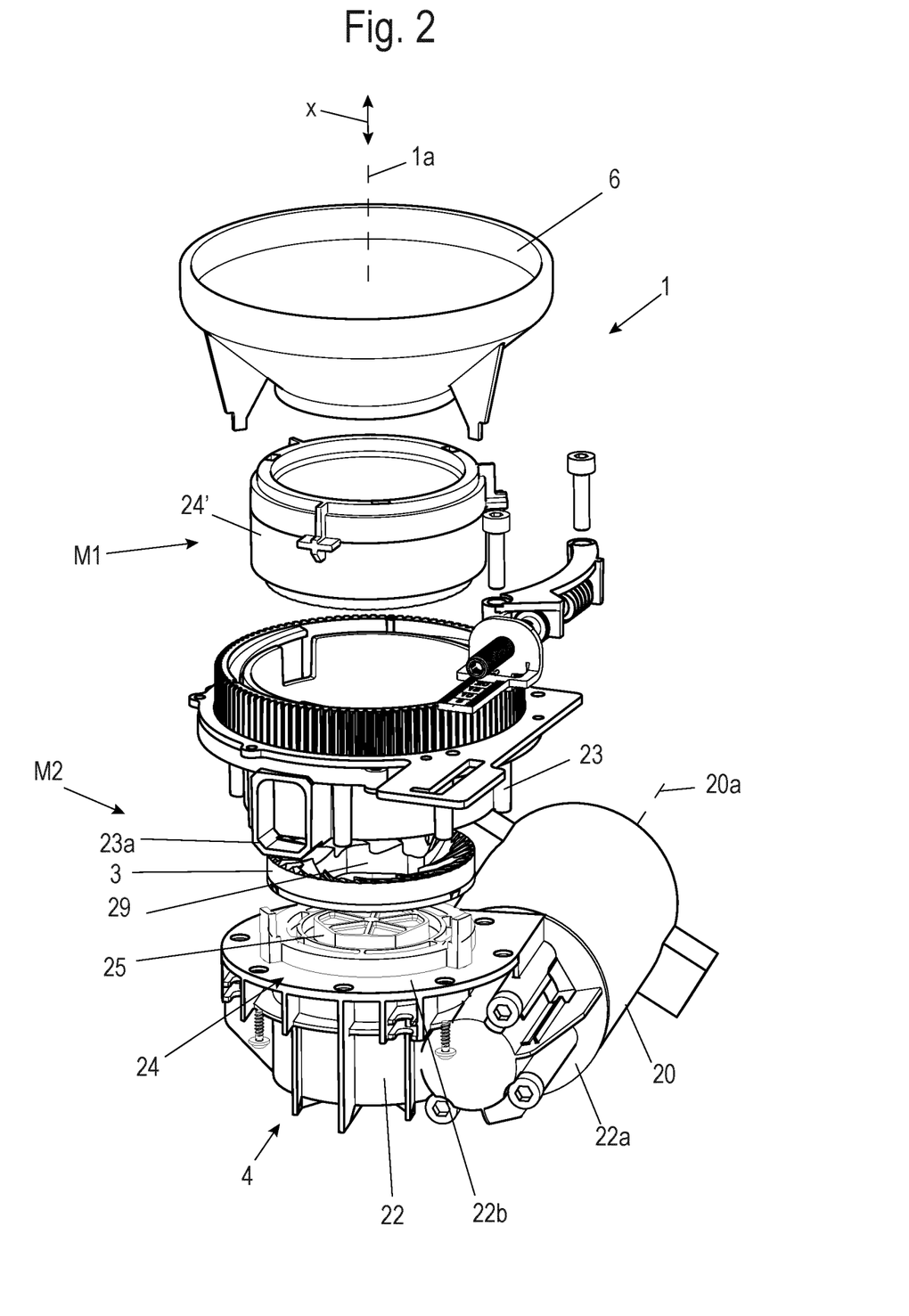
FIG. 2: shows a schematic exploded view of an exemplary embodiment of the grinder according to the invention as shown in FIG. 1.

FIG. 1 shows a schematic front view in section of a principle of a grinder 1 according to the invention for grinding coffee beans 5. FIG. 2 shows a schematic exploded view of an exemplary embodiment of the grinder 1 according to the invention as shown in FIG. 1.

The grinder 1 has a grinder axis 1a, a first grinding disk carrier M1 having a first grinding disk 2, a second grinding disk carrier M2 having a second grinding disk 3, and a drive unit 4. The grinding disks 2, 3 are designed here as so-called grinding disks. The first grinding disk 2 is mounted in a rotationally fixed manner in the first grinding disk carrier M1. In this respect, the first grinding disk 2 is stationary during operation of the grinder 1.

The first grinding disk 2 has a cylindrical envelope geometry and a centric aperture 5. The first grinding disk 2 can also be designed differently, e.g. as a grinding cone. The aperture 5 is penetrated here by a feed hopper 6. Coffee beans 7 to be ground are fed to the grinder 1 through the feed hopper 6 and the aperture 5. The grinder 1 can also be provided for grinding other luxury foods or foodstuffs, but preferably it is provided for grinding coffee beans 7. The feed hopper 6 is advantageously designed in such a way that undesirable bridging of the coffee beans 7 in the feed hopper 6 is prevented.

Each grinding disk 2, 3 has a rear side 8, 9 and a grinding side 10, 11. The rear side 8 of the first grinding disk 2 faces the feed hopper 6. The second grinding disk 3 has its rear side 9 coupled to the drive unit 4. This is explained in more detail below.

The grinding sides 10, 11 are each provided with a recess 12, 13, which is concave or conical in this case, and with at least one grinding edge 14, 15.

The grinding disks 2, 3 are arranged with their grinding sides 10, 11 facing each other. Here, the second grinding disk 3 of the second grinding disk carrier M2 is arranged coaxially to the grinder axis 1a and to the first grinding disk 2 as well as below the first grinding disk 2. The term "below" refers to the drawing plane of FIG. 1. The second grinding disk 3 rotates during operation of the grinder 1. This will be described further below.

The conical recess 12 of the first grinding disk 2 and the conical recess 13 of the second grinding disk 3 thus form a kind of double-conical grinding chamber 16, which opens out at its outer circumference into a grinding gap 17. A collecting device (not shown here) can be connected to the grinding gap 17, which collects the coffee beans—preferably coffee powder—emerging from the grinding gap 17 and feeds them to an extraction process.

The second grinding disk 3 also has a cylindrical envelope geometry. The second grinding disk 3 can also be designed differently, e.g. as a grinding cone. The second grinding disk 3 is rotatable relative to the first grinding disk 2 about the grinder axis 1a. Here, the second grinding disk 3 is coupled to the drive unit 4 in such a way that the second grinding disk 3 is set into a rotary motion during operation of the grinder, while the first grinding disk 2 is stationary.

This is advantageous, but not mandatory. Alternatively, the first grinding disk 2 can also be rotatable, while the second grinding disk 3 is stationary. It is also possible for both grinding disks 2, 3 to be rotatable—e.g. in opposite directions of rotation and/or at different speeds, so that there is always a relative movement between the two grinding disks 2, 3.

The grinder 1 also has at least one force-generating device 18. Here, the force-generating device 18 acts on the first grinding disk 2. As a result, a respective force F acts continuously on coffee beans located between the first grinding disk 2 and the second grinding disk 3. This is advantageous, but not mandatory. The force generating device 18 can also act on the second rotatable grinding disk 3 or on both grinding disks 2, 3.

The force-generating device 18 comprises here two compression springs 18a which can be pretensioned by a variable pretensioning travel X by means of a corresponding device, for example by a servomotor, which is not described here and is not discussed further, so that the respective force F acting on the first grinding disk 2 and thus on the coffee beans is variable or adjustable in its amount. The compression springs 18a exert a thus adjustable or variable axial force perpendicular to a plane E of the grinding gap 17 on the first and/or second grinding disk 2, 3.

Furthermore, the force acting on the coffee beans by the grinder 1 can be advantageously set by the force generation device 18 depending on the coffee beans 7 to be ground and the respective desired degree of grinding. Preferably, data records relating to the respective degree of grinding, the type of bean and the force to be generated by the force-generating device 18 are stored for this purpose on a data memory of a control and/or evaluation unit 19 for controlling a coffee machine and in particular the grinder 1. The aforementioned control and/or evaluation unit 19 can be assigned to the grinder 1 or be part of a coffee machine, for example a fully automatic coffee machine.

The second grinding disk 3 is driven here by a drive motor 20 of the drive unit 4 via a drive shaft 21, which is only indicated in FIG. 1.

Alternatively, a shaftless direct drive is also possible, in which one of the grinding disks 2, 3 is the rotor of the drive motor 10, or an indirect drive, in which the drive motor 10 acts on one of the grinding disks 2, 8 via a transmission.

As shown in FIG. 2, the first grinding disk carrier M1 includes the first grinding disk 2, the feed hopper 6, and a carrier 24'. The first grinding disk carrier M1 is also called the upper grinding disk carrier M1.

The first grinding disk carrier M1 with the first grinding disk 2 is arranged in the assembled state in a grinding housing 23 together with the second grinding disk 3 in the manner schematically indicated in FIG. 1.

The grinding housing 25 is arranged coaxially with respect to the grinder axis 1a and has an ejection section 23a in an undesignated bottom section, which is open radially outwardly. The grinding housing 25 is not described further.

FIG. 2 also indicates an undesignated grinding degree indicator that interacts with an adjustment device of the force generation device 18, which is also not shown. The grinding degree indicator is not further described here.

The second grinding disk carrier M2 is also referred to as the lower grinding disk carrier M2 and includes the second grinding disk 3 and a carrier 24.

The second grinding disk 3 is placed on the carrier 24 and is connected to it in a rotationally fixed manner. For this purpose, a contour 25 of the carrier 24 is in engagement with an inner contour 29 of the second grinding disk 3. This will be described further below.

The carrier 24 is connected to the drive shaft 21, which is disposed in an interior of a housing of a transmission 22 of the drive unit 4. This is not shown, but can be easily imagined. In this example, the drive motor 20 having a drive motor shaft 20a is fixed to the transmission 22 via a screw-on flange 22a of the housing of the transmission 22.

The grinding housing 23 is fastened on a flange 22b of the housing of the transmission 22, here facing upwards towards the grinding disk carriers M2, M1, by means of fastening elements, e.g. screws. In this case, the bottom section of the grinding housing 23 surrounds the second grinding disk 3, wherein the first grinding disk 2 is then arranged in an upper section of the grinding housing 23 in the assembled state.

Figure 3:
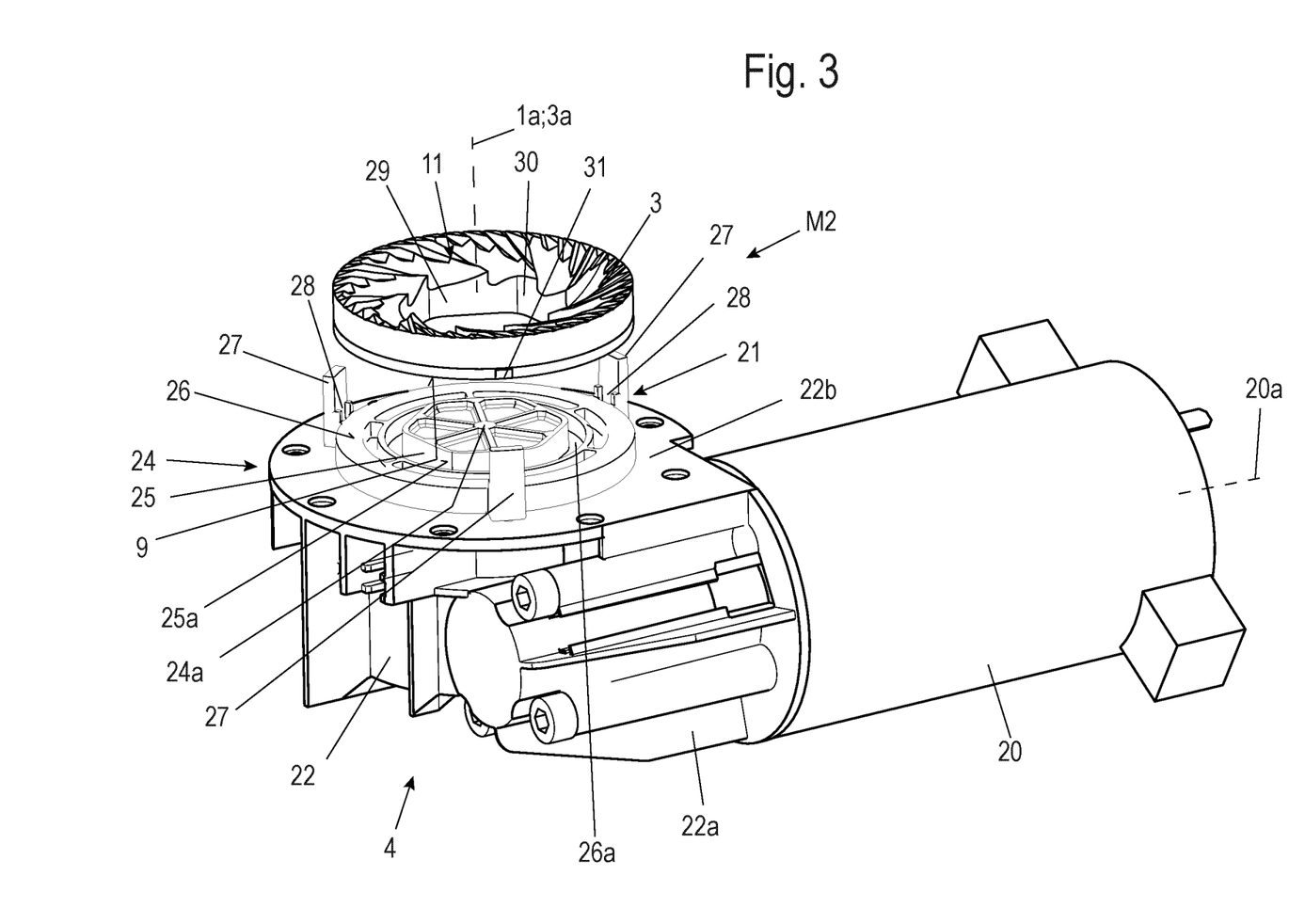
FIGS. 3-4: show schematic representations of a drive unit of the grinder according to the invention and according to FIG. 2 with a grinding disk.
Figure 4:
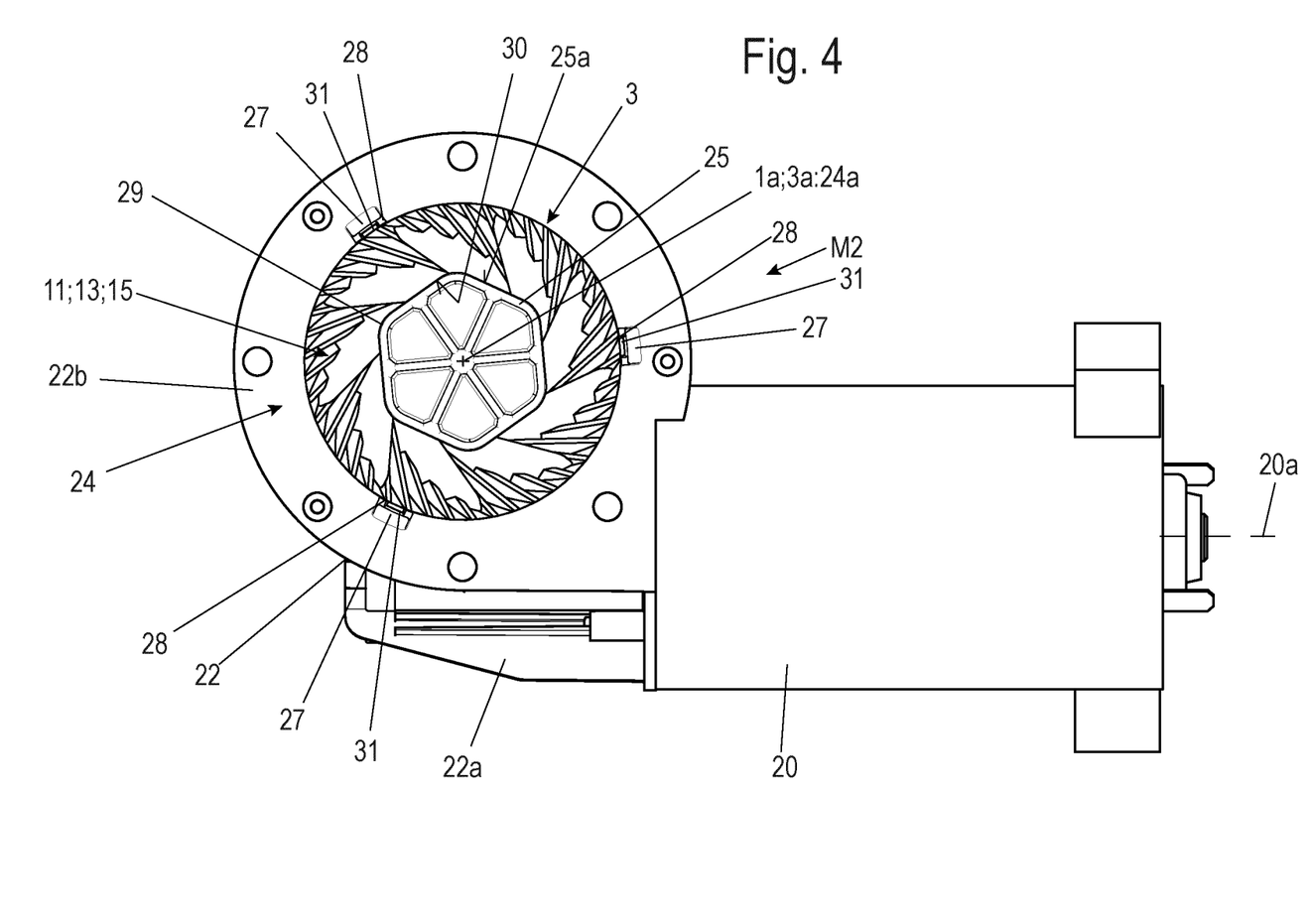

FIG. 3 shows a schematic perspective view of the drive unit 4 of the grinder 1 according to the invention as shown in FIG. 2 with the second grinding disk 3 not yet mounted. FIG. 4 shows a schematic top view of the drive unit 4 in the direction of the grinder axis 1a.

The drive unit 4 has, for example, a worm gear between the drive shaft 21 and the drive motor 20. The drive shaft 21 is connected at its upper end to the carrier 24, which rotates with it about the grinder axis 1a. The carrier 24 can also be made in one piece with the drive shaft 21.

The carrier 24 is provided on its upper surface, which faces the grinding housing 23, with a driver and ejector geometry of the grinder 1. The carrier 24 includes the contour 25, a ring section 26 and tab-like projections 27.

The contour 25 is formed here as a central outer contour in a hexagonal shape with outwardly facing contour surfaces 25a around the center of the carrier 14 through which the grinder axis 1a extends.

The ring section 26 is arranged coaxially with the contour 25 and the grinder axis 1a and surrounds the contour 25, with an annular clearance 26a being defined between the contour 25 and the ring section 26.

On the outer circumference of the ring section 26, the tab-like projections 27 are arranged in a regularly distributed manner (here, three projections 27), which protrude from the ring section 26 of the carrier 24.

In the transition regions between the projections 27 and the outer diameter of the ring section 26, respective indents 28 are formed in the projections 27, which are open at the top.

Like the first grinding disk 2, the second grinding disk 3 has a central opening, which is referred to here as the inner contour 29 and is formed with contour surfaces 30. The inner contour 29 of the second grinding disk 3 corresponds with the outer contour 25 of the carrier 24 of the drive unit 4.

On the outer circumference of the second grinding disk 3, radially projecting lugs 31 are formed in a regularly distributed manner on the edge towards the rear side 9. Here there are three lugs 31.

In the assembled state, the second grinding disk 3 is placed on the carrier 24 in such a way that the inner contour 29 of the grinding disk 3 is in engagement with the outer contour 25 of the carrier 24, wherein a grinding disk axis 3a of the second grinding disk 3 is coaxial with a carrier axis 24a of the carrier 24 and coaxial with the grinder axis 1a. Further, the rear side 9 of the second grinding disk 3 rests on the ring section 26 of the carrier 24, wherein an annular projection 32 (see FIGS. 9, 10) of the second grinding disk 3 projects into or is received in the clearance 26a. The annular projection 32 protrudes from the rear surface 9 of the second grinding disk 3, as can best be seen in FIGS. 9 and 10. Here, the lugs 31 are accommodated in the indents 28 of the projections 27.

The contour 25 of the carrier 24 and the inner contour 29 of the second grinding disk 3 form an advantageous form fit between the second grinding disk 3 and the carrier 24 for transmitting the grinding disk torque, which transmits large forces and at the same time does not cause any disturbing openings in which coffee grounds can settle. This can be clearly seen in the top view in FIG. 4.

A particularly elegant option is the form fit at the inner passage area of the second grinding disk 3, which is usually designed as a simple through-hole or aperture and where no finely ground coffee is yet present at this point. However, the through hole is designed as a positive inner contour 29, here for example as a hexagon. Of course, other geometric shapes such as square, polygon, oval, ellipse and the like are also possible. In this way, particularly large torques can be transmitted and no disturbing geometries are created on the outer diameter of the second grinding disk 3.

The lugs 31 integrally formed on the circumference of the second grinding disk 3 are designed as contour-integrated, so-called snap lugs. Since the torque for the grinding disk, in this case the second grinding disk 3, is transmitted via the form fit of the contour 25 of the carrier 24 and the inner contour 29 at the inner passage of the second grinding disk 3, the lugs 31 can be designed very filigree, since they do not transmit any torque.

The lugs 31 are recessed in the lower grinding disk carrier M2 in the carrier 24 ideally behind the ejector geometries, i.e. in the indents 28 on the projections 27. Since both grinding disks 2, 3 are designed identically, the lugs 31 for the second grinding disk 3 serve here only for guidance. The function of the lugs 31 on the first grinding disk 2 is explained below.

The contour 25 of the carrier 24 and the inner contour 29 of the second grinding disk 3 may form a fit. If the second grinding disk 3 is no longer to be removed from the grinder 1 by an operator of a coffee machine to which the grinder 1 with the second grinding disk 3 is assigned, this fit can be formed as an interference fit.

If it is desired to dismantle the second grinding disk 3 for maintenance reasons, the form fit of the contours 25, 29 (e.g. hexagon) is designed as a clearance fit. Since the first grinding disk 2 and the second grinding disk 3 press apart during the grinding process, no further axial securing of the lower, i.e. the second grinding disk 3 is required. Thus, the second grinding disk 3 is merely inserted into the carrier 24, which is a very assembly- and maintenance-friendly solution.

Figure 5:
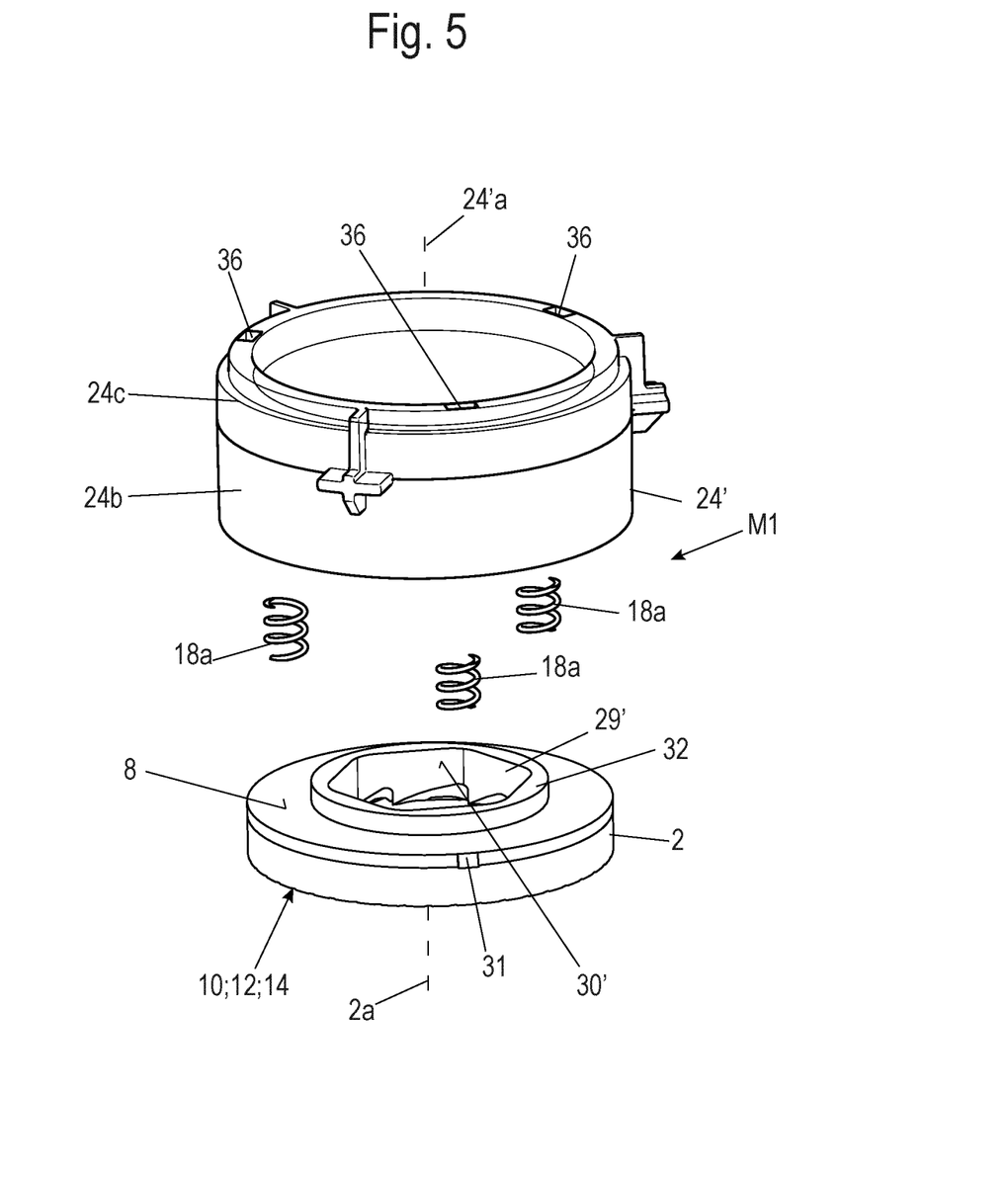
FIGS. 5-6: show schematic exploded views of a grinding disk carrier with a grinding disk of the grinder according to the invention as shown in FIG. 2.
Figure 6:
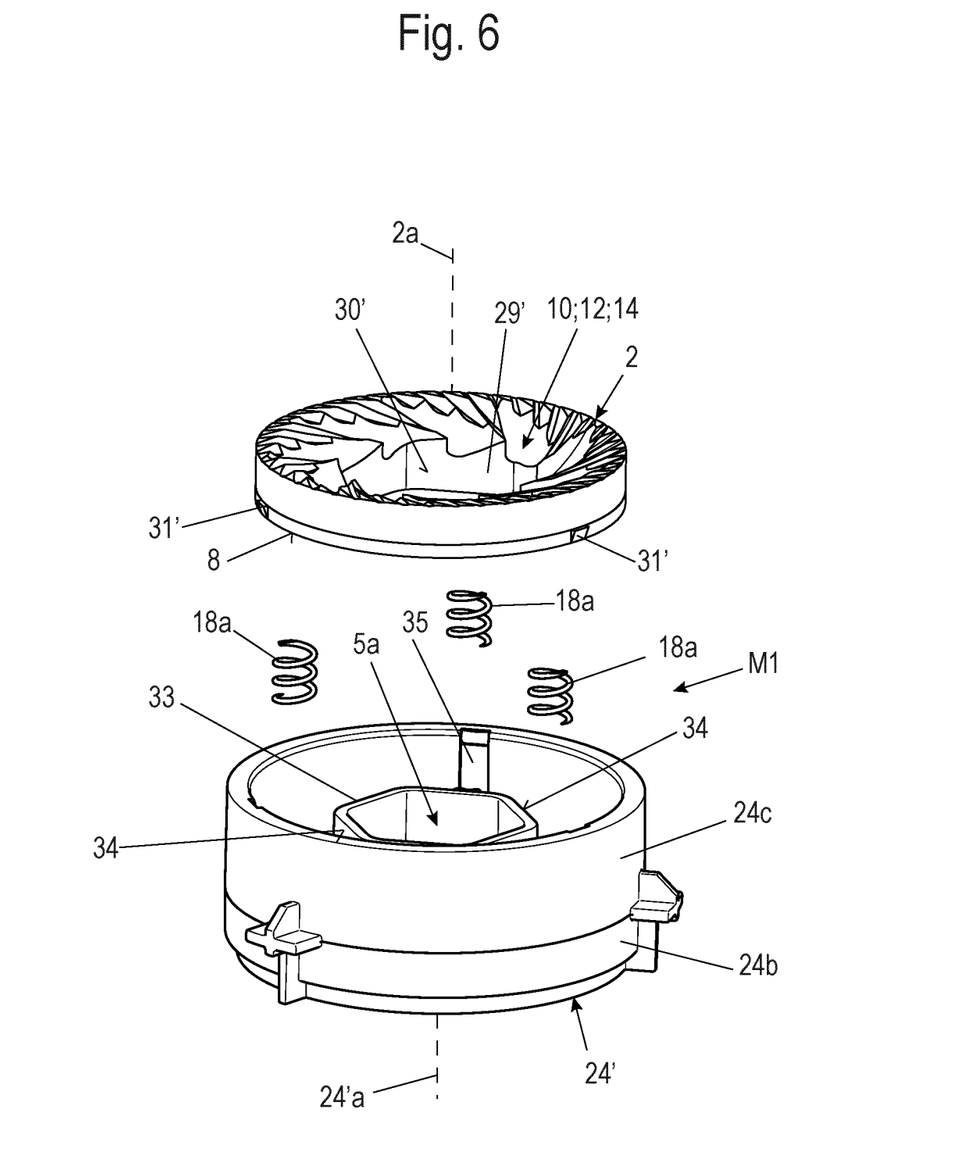
Figure 7:
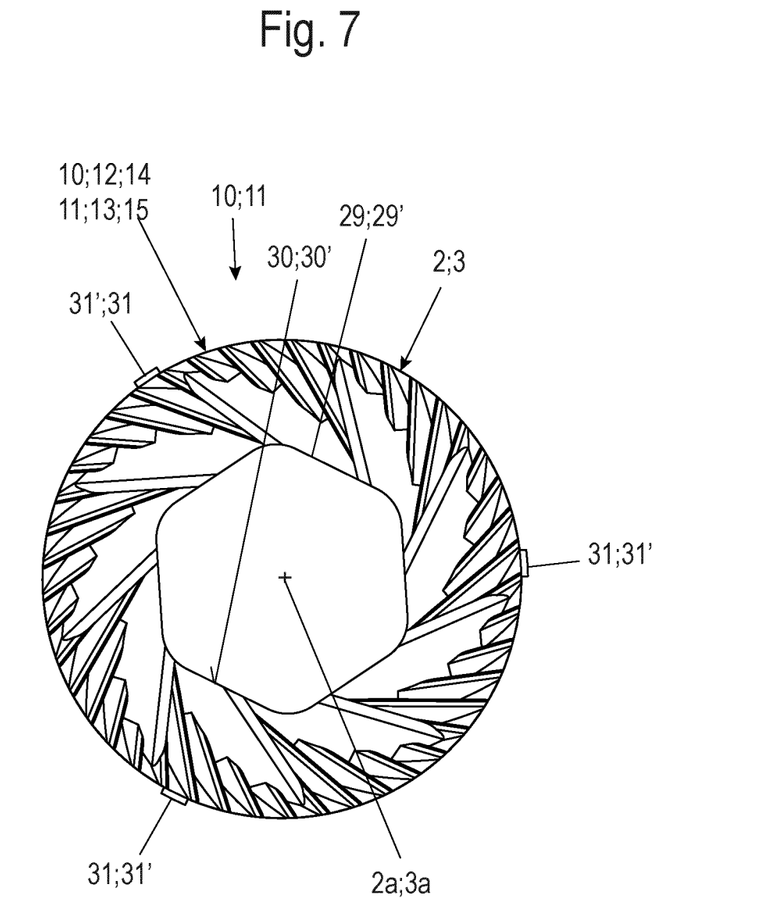
FIGS. 7-9: show schematic representations of a grinding disk of the grinder according to the invention as shown in FIG. 2.
Figure 8:
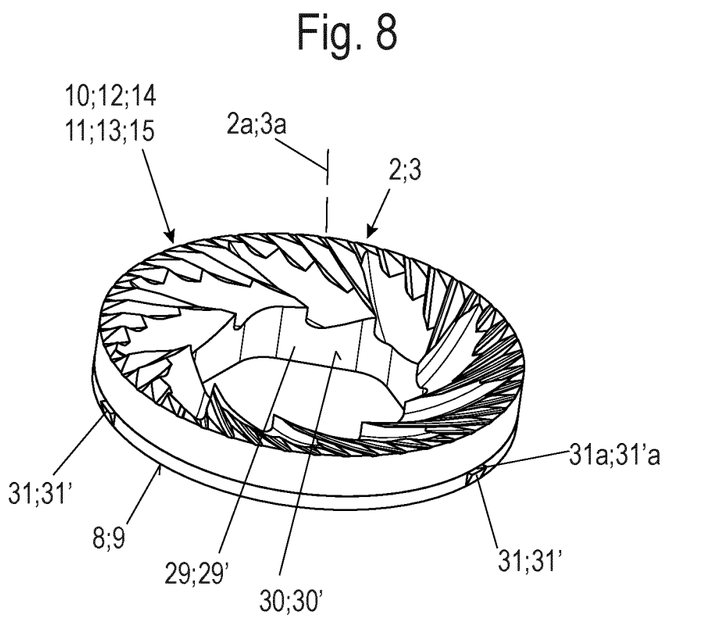
Figure 9:
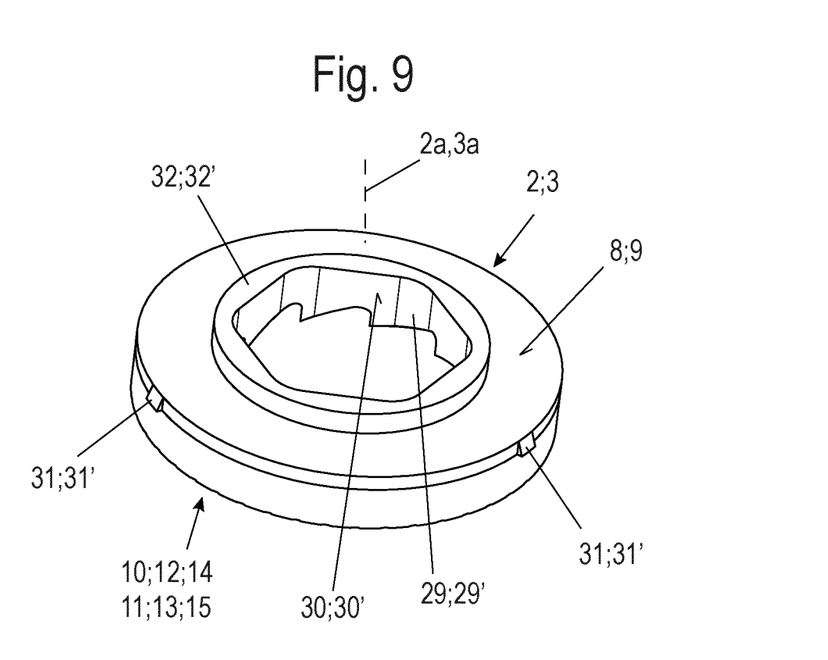
Figure 10:
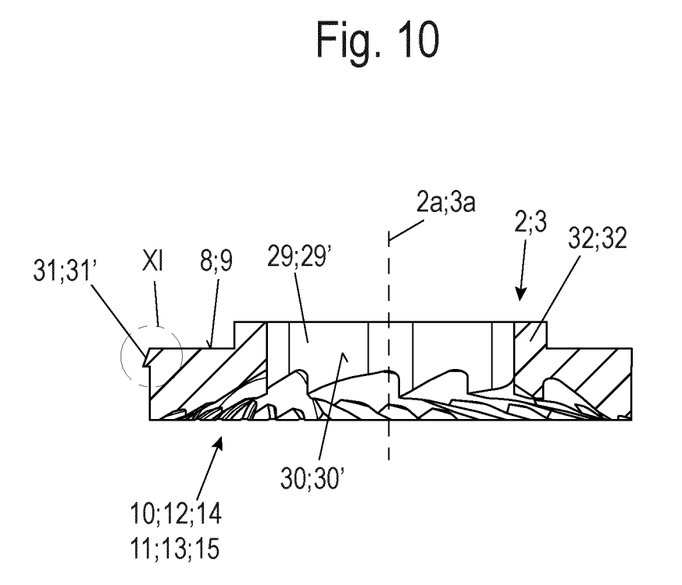
FIGS. 10-11: show schematic sectional views of the grinding disk according to FIGS. 7-9.
Figure 11:
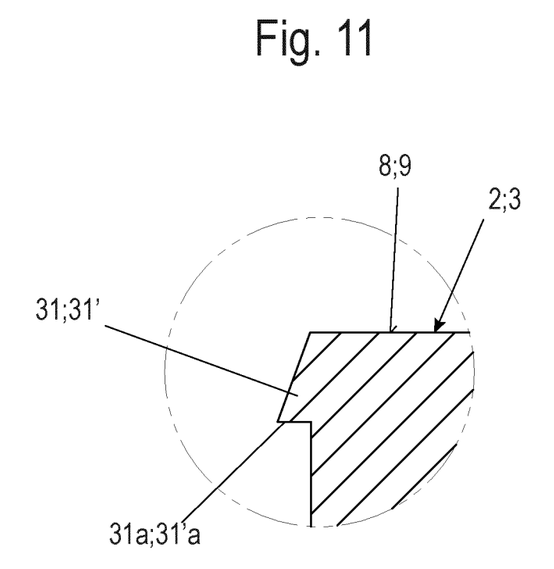

FIG. 5 shows a schematic exploded view of the first grinding disk carrier M1 with the first grinding disk 2 of the grinder 1 according to the invention as shown in FIG. 2. In FIG. 6, the view according to FIG. 5 is shown rotated by 180° about an axis perpendicular to the drawing. FIG. 7 shows a schematic top view of the grinding side 10, 11 of the grinding disk 2, 3. FIG. 8 shows a schematic perspective view of the grinding side 10, 11 of the grinding disk 2, 3; FIG. 9 shows a schematic perspective view of the rear side 8, 9 of the grinding disk 2, 3. FIG. 10 shows a schematic sectional view of the grinding disk 2, 3, and FIG. 11 shows an enlarged section XI of FIG. 10 with a nose 31, 31'.

The upper or first grinding disk carrier M1 comprises the first grinding disk 2 with its grinding disk axis 2a, compression springs 18a and the carrier 24' with its carrier axis 24'a.

In this exemplary embodiment, the first grinding disk 2 is designed in the same way as the second grinding disk 3, i.e. both grinding disks 2, 3 are identical. To distinguish them from the second grinding disk carrier M2 and the second grinding disk 3, the carrier 24' of the first grinding disk carrier M1, the inner contour 29', the contour surfaces 30' and the lugs 31' of the first grinding disk 2 are provided with an apostrophe.

The first grinding disk 2, like the second grinding disk 3, has a central aperture, referred to here as the inner contour 29' and formed with contour surfaces 30'.

The first grinding disk 2 spring-loaded with the compression springs 18a is inserted into the carrier 24', guided in the carrier 24' and braced in a manner not shown. The grinding disk axis 2a of the first grinding disk 2 and the carrier axis 24'a of the carrier 24' extend coaxially and, in the assembled state of the grinder 1, coaxially with the grinder axis 1a.

Here, the first grinding disk 2 including the compression springs 18a for force control is permanently inserted, e.g. clipped, into a carrier insert 24c, e.g. plastic carrier. The carrier insert 24c is inserted into and connected to a carrier base 24b of the carrier 24' in a manner not shown in more detail, e.g. via a snap-in/clip connection. The carrier 24' is formed here with the carrier base 24b and the carrier insert 24c as a multi-part component. However, the carrier 24' can also be integral with the carrier base 24b and the carrier insert 24c.

As shown in FIG. 6, the carrier 24' has a protruding contour projection 33 with outer contour surfaces 34 in its interior. The contour projection 33 corresponds with the inner contour 24' of the first grinding disk 2. In contrast to the contour 25 of the second grinding disk carrier M2, the contour projection 33 of the first grinding disk carrier M1 is provided with a centric aperture 5a. This aperture 5a extends or supplements the centric aperture 5 described above in order to allow the coffee beans 7 from the feed hopper 6 to access the grinding chamber 16 between the grinding disks 2, 3.

The contour-integrated lugs 31' ("snap lugs"), which are advantageously integrally formed on the circumference of the first grinding disk 2, ensure here the axial securing of the first grinding disk 2 in the carrier 24' of the first grinding disk carrier M1. The first grinding disk 2 is clipped into the carrier insert 24c, e.g. plastic carrier, in such a way that the lugs 31' are each accommodated in a groove 35 of the carrier insert 24c in a displaceably guided manner. The grooves 35 extend parallel to the carrier axis 24'a of the carrier 24 and each have a projection 36 at their lower ends, which forms an axial stop for a stop surface 31'a of the respective lug 31' guided in the associated groove 35. In this way, the first grinding disk 2 is axially secured in the carrier insert 24c of the carrier 24.

In this case, the compression springs 18a are disposed between the rear side 8 of the first grinding disk 2 and are supported on associated support sections of the carrier base 24b of the carrier 24' in a manner that is not shown but can be easily imagined. The compression springs 18a are arranged symmetrically about the grinding disk axis 2a and about the grinder axis 1a, in order to achieve an optimally distributed application of force. However, more than the three compression springs 18a shown may be provided.

A helical spring is preferred as compression spring 18a for the present application. However, springs or spring assemblies of other types can also be used.

The first grinding disk 2 thus has an axial degree of freedom in the direction of its grinding disk axis 2a, i.e. in the direction of the carrier axis 24'a and the grinding axis 1a of the grinder 1. This will be explained in further detail below.

Since a tool torque, i.e. a holding torque, is transmitted via the form fit of the contour projection 33 of the carrier 24' and the inner contour 29' at the inner passage of the first grinding disk 2, the snap geometry (lugs 31' and projections 36) can be very filigree. Due to this constructive design, it is possible to design the lower and upper grinding disks 2, 3 as identical parts.

FIGS. 7-9 show the design of the inner contour 29, 29' with the contour surfaces 30, 30' as a hexagon with rounded corners. Other form-fitting contours are of course possible, such as square, polygon, oval, ellipse, etc. Together with the contour 25 of the carrier 24 of the second grinding disk carrier M2, the inner contour 30 of the second grinding disk 3 is tightly sealed in the inserted state (see FIG. 4) in such a way that no coffee grounds can be deposited in this area and easy cleaning is possible.

The inner contour 29, 29' is formed continuously into the grinding disk 2, 3, even through the annular projection 32, 32', as can be clearly seen in FIG. 9.

The lugs 31, 31' protrude radially from the outer periphery of the grinding disk 2, 3 at the edge of the rear side 8, 9. The lugs 31, 31' widen from the rear side 8, 9 to a stop surface 31a, 31'a in an axial direction relative to the grinding disk axis 2a, 3a. This is shown enlarged in FIG. 11.

In FIG. 10, it can be seen that the recess 12, 13 forms a concave envelope with the grinding edges 14, 15 on the grinding side 10, 11.

Figure 12:
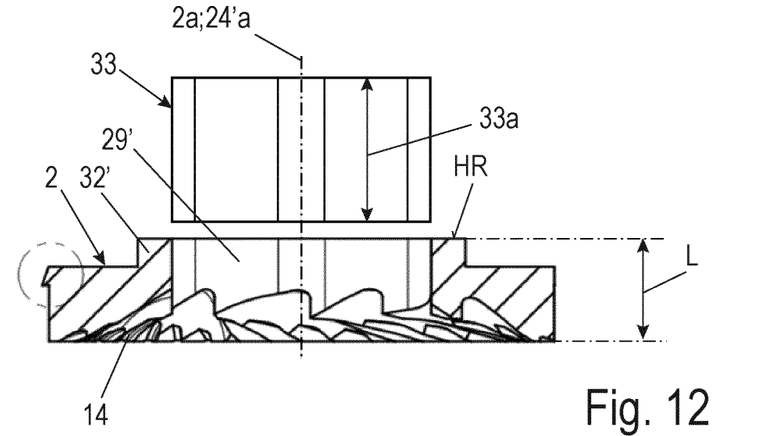
FIGS. 12-14: show schematic sectional views of the grinding disk according to FIGS. 7-9 in different stroke positions.
Figure 13:
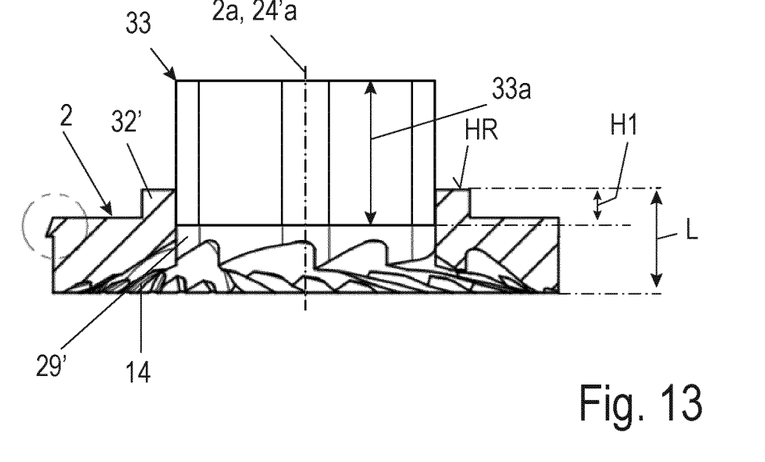
Figure 14:
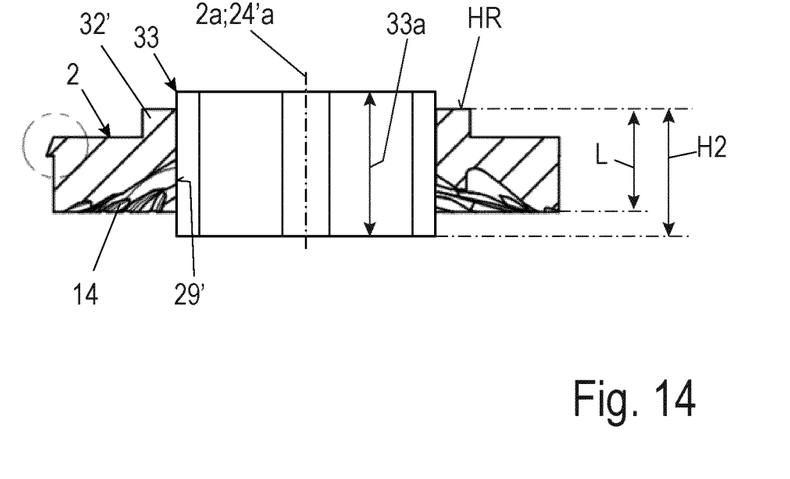

FIGS. 12-14 show schematic sectional views of the first grinding disk 2 according to FIGS. 7-9 in various stroke positions in relation to the associated contour projection 33 of the first grinding disk carrier M1.

In FIG. 12, the grinding disk 2 is not pushed onto the contour projection 33. The first grinding disk 2 has an axial length L in the direction of the grinding disk axis 2a, i.e., in the direction of the carrier axis 24'a. A length 33a of the contour projection 33 in the direction of the carrier axis 24'a is greater here than the axial length L of the first grinding disk 2.

The area of the annular projection 32' serves as a stroke reference HR for further considerations.

In FIG. 13, the first grinding disk 2 is pushed with its inner contour 29' onto the contour projection 33a in the direction of the axes 2a, 24'a to such an extent that a relative stroke H1 of the grinding disk 2 results with respect to the stroke reference HR. In the example shown, this relative stroke H1 is somewhat greater than an axial length of the annular projection 32'. The first grinding disk 2 thus has one axial degree of freedom in the direction of the axes 2a; 24'a.

This axial degree of freedom of the first grinding disk 2 with respect to the contour projection 33 also makes it possible for a relative stroke H2 greater than the axial length L of the first grinding disk 2 to be achieved. This is shown in FIG. 14, in which the inner contour 29' of the first grinding disk 2 is fully pushed onto the contour projection 33a and the contour projection 33a protrudes through the inner contour 29' out of the area of the grinding edge 14. This position can also be used for cleaning the recess 13 in the grinding edges 14.

A limitation of the stroke of the first grinding disk 2 with respect to the contour projection 33 can be realized, for example, by a stop of the first grinding disk 2 with the stroke reference HR at a stop not shown in the carrier 24.

The torque for the grinding disk 2, 3, in this case the second grinding disk 3, is transmitted via the form fit of the contour 25 of the carrier 24 and the inner contour 29, 29' at the inner passage of the grinding disk 2, 3. This form fit is a central interlocking connection as a continuous shaft-hub connection for direct torque transmission from the drive directly or indirectly to the grinding disk 2, 3. The central interlocking connection exists here between the contour 25 of the contour projection 33 of the carrier 24 and the inner contour 29, 29' of the grinding disk 2, 3.

The grinding disks 2, 3 are formed in one piece. The form fit is achieved directly via the geometric shape of the inner contour 29 of the grinding disk 3, e.g. as a hexagonal contour as already described above. Such a hexagonal contour is smooth-walled and has no grooves. Additional or/and intermediate components, such as keys and the like, are therefore not required. As a result, the places where coffee grounds can settle are considerably minimized.

The invention is not limited by the above exemplary embodiment, but is modifiable within the scope of the claims.

For example, it is conceivable that the first grinding disk 2 is inserted into the first grinding disk carrier 24' without springs 18a.

LIST OF REFERENCE SIGNS

1 Grinder
1a Grinder axis
2, 3 Grinding disk
2a, 3a Grinding disk axis
4 Drive unit
5 Aperture
6 Feed hopper
7 Coffee bean
8, 9 Rear side
10, 11 Grinding side
12, 13 Recess
14, 15 Grinding edge
16 Grinding chamber
17 Grinding gap
18 Force-generating device
18a Compression spring
19 Control and/or evaluation unit
20 Drive motor
20a Drive motor axis
21 Drive shaft
22 Transmission
22a Motor flange
22b Flange
23 Grinding housing
23a Ejection section
24, 24' Carrier
24a, 24'a Carrier axis
24b Carrier base
24c Carrier insert
25 Contour 25a Contour surface
26 Ring section
26a Clearance
27 Projection
28 Indent
29, 29' Inner contour
30, 30' Contour surface
31, 31' Lug
31a, 31'a Stop surface
32, 32' Annular projection
33 Contour projection
33a Length
34 Contour surface
35 Groove
36 Projection
E Plane
F Force
H1, H2 Stroke
HR Stroke reference
L Axial length
M1, M2 Grinding disk carrier
X Pretensioning travel

The invention claimed is:

1. A grinder (1) for grinding coffee beans (5), wherein the grinder (1) comprises a first grinding disk carrier (M1) having a first grinding disk (2), a second grinding disk carrier (M2) having a second grinding disk (3) and a drive unit (4), by means of which at least one of the two grinding disks (2, 3) is rotatably operated, wherein at least the second grinding disk (3) of the two grinding disks (2, 3) is rotatably operated by the drive unit (4) and is coupled to the drive unit (4) directly or indirectly via a central interlocking connection, wherein this central interlocking connection is designed as a continuous shaft-hub connection of a direct torque transmission from the drive unit (4) directly or indirectly to the grinding disk (2, 3),
and wherein the first grinding disk (2) has a centric inner contour (29') that is in positive engagement with a centric contour projection (33) of a carrier (24') of the first grinding disk carrier (M1).

2. The grinder (1) according to claim 1, wherein at least the first grinding disk (2) or both grinding disks (2, 3) have an aperture with the centric inner contour (29, 29').

3. The grinder (1) according to claim 2, wherein both grinding disks have the aperture with the centric inner contour (29, 29') and wherein the second grinding disk (3) of the two grinding disks (2, 3) which is rotatably driven by the drive unit (4) is in positive engagement with its aperture with the centric inner contour (29) with a centric contour (25) of a carrier (24) of the second grinding disk carrier (M2), wherein the carrier (24) of the second grinding disk carrier (M2) is connected to a drive shaft (21) of the drive unit (4).

4. The grinder (1) according to claim 3, wherein the carrier (24) of the second grinding disk carrier (M2) has a ring section (26) which is arranged around the centric contour (25).

5. The grinder (1) according to claim 4, wherein the carrier (24) of the second grinding disk carrier (M2) has a clearance (26a) which is defined by the ring section (26) and the centric contour (25).

6. The grinder (1) according to claim 1, wherein the contour projection (33) of the carrier (24') of the first grinding disk carrier (M1) has a centric aperture (5a).

7. The grinder (1) according to claim 1, wherein both grinding disks (2, 3) each have radially projecting lugs (31, 31') which are integrally formed on outer circumferences of the two grinding disks (2, 3) in a regularly distributed manner.

8. The grinder (1) according to claim 7, wherein the first grinding disk (2) of the two grinding disks (2, 3) is inserted into a carrier (24') of the first grinding disk carrier (M1) and is axially guided in the carrier (24') and axially secured by means of the lugs (31').

9. The grinder (1) according to claim 8, wherein the first grinding disk (2) of the two grinding disks (2, 3) is inserted into the carrier (24') of the first grinding disk carrier (M1) in such a way that the lugs (31') are each guided axially displaceably in a groove (35) and are received in an axially secured manner.

10. The grinder (1) according to claim 1, wherein tab-like projections (27) are arranged in a regularly distributed manner on an outer circumference of a ring section (26) of the carrier (24) of the second grinding disk carrier (M2), which projections (27) project from the ring section (26) of the carrier (24) of the second grinding disk carrier (M2), wherein the tab-like projections (27) each have an indent (28) formed therein, which engages with a respective lug (31) of the second grinding disk (3) of the two grinding disks (2, 3), which is rotatably driven by the drive unit (4).

11. The grinder (1) according to claim 1, wherein the grinder (1) is designed as a disk grinder.

12. The grinder (1) according to claim 3, wherein the centric inner contours (29, 29') of the two grinding disks (2, 3), the contour projection (33) of the carrier (24') of the first grinding disk carrier (M1) and the centric contour (25) of the carrier (24) of the second grinding disk carrier (M2) are formed as a polygon, wherein the centric inner contour (29') of the first grinding disk (2, 3) of the two grinding disks (2, 3) and the contour projection (33) of the carrier (24') of the first grinding disk carrier (M1) correspond with each other, and wherein the centric inner contour (29) of the second grinding disk (3) of the two grinding disks (2, 3), which is rotatably driven by the drive unit (4), and the centric contour (25) of the carrier (24) of the second grinding disk carrier (M2) correspond with each other.

13. The grinder (1) according to claim 1, wherein the two grinding disks (2, 3) are of identical design.

14. A coffee machine, in particular fully automatic coffee machine having at least one grinder (1) according to claim 1.

* * * * *